US012360841B1

(12) United States Patent
Clarke et al.

(10) Patent No.: US 12,360,841 B1
(45) Date of Patent: Jul. 15, 2025

(54) PROACTIVE STABILITY ENGINE FOR SOFTWARE SYSTEMS

(71) Applicant: MORGAN STANLEY SERVICES GROUP INC., New York, NY (US)

(72) Inventors: Christopher D. Clarke, Lake Hopatcong, NJ (US); William M. O'Dwyer, Huntington, NY (US); Nicholas C. Drewanz, Brooklyn, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/752,526

(22) Filed: Jun. 24, 2024

(51) Int. Cl.
*G06F 11/00* (2006.01)
*G06F 11/07* (2006.01)

(52) U.S. Cl.
CPC ...... *G06F 11/0793* (2013.01); *G06F 11/0787* (2013.01)

(58) Field of Classification Search
CPC ............. G06F 11/0793; G06F 11/0787; G06F 11/3086
See application file for complete search history.

(56) References Cited

U.S. PATENT DOCUMENTS 11,210,160 B1 * 12/2021 Dukhovny .......... G06F 11/0751
11,595,495 B2    2/2023  Garg et al.
11,914,992 B2    2/2024  Jayapathi et al.

OTHER PUBLICATIONS

Microsoft.com, Review events and errors using Event Viewer, Apr. 24, 2024, Microsoft.com, 25 pages (Year: 2024).*

* cited by examiner

*Primary Examiner* — Katherine Lin
(74) *Attorney, Agent, or Firm* — Weitzman Law Offices, LLC (57) ABSTRACT

A computer-implemented method and system for averting possible disruptions to at least one software service is described. The method includes querying the data storage to identify a prevalence of errors associated with a particular software component or hardware component; supplementing identified errors with upstream and downstream contextual metadata and generating a profile of a current state of the plurality of software components and hardware components; matching the generated profile with a past profile, the past profile being associated with a desired automated triage action; and performing the automated triage action.

16 Claims, 9 Drawing Sheets

PROACTIVE STABILITY ENGINE FOR SOFTWARE SYSTEMS

FIELD

This disclosure relates to computer systems and methods and, more particularly, to logging of and prediction of possible software errors or hardware faults.

BACKGROUND

Many computing networks, web applications, and application programming interfaces (APIs) increasingly rely on a large number of components having upstream dependencies and having downstream components that depend on them in turn. A software or hardware error at any point in the system may cascade down and negatively affect end users, but the logging at the end user point may be unable to identify what component is the ultimate source of an incident or ongoing problem. For example, if a user attempts to access a dashboard in a web application and gets a failure, it is not immediately obvious whether the user's credentials have been rejected, whether the user lacks entitlements to view the web app, whether a server hosting the web app is overtaxed, whether an API that the web app makes use of is currently down, whether a database that the web app pulls from is down, and so on.

Single errors may occur in isolation at any point due to a dropped packet or other issue, and are not cause for alarm. However, errors will quickly become more common if a major incident is commencing, and identifying the inflection point between random happenstance and a pattern is difficult. Existing monitoring tools available on the market and advertised as "APM" (Application Performance Monitoring) solutions used by support groups offer no ability to identify the existence of a possible interruption of service or to analyze and suggest remedies for that interruption. Minimizing the time to resolution of an incident is critical, whether for technical reasons (e.g., lost data, corrupted logs, etc.) or human ones (e.g., guaranteed uptime, service level agreements, etc.)

SUMMARY

In order to address the limitations of previous systems in this field, new methods of automated triage are disclosed, as we have determined that there are advantages to developing methods to automate the ingestion and analysis of data logs from all nodes in a network of dependencies and to improve the speed, accuracy, and finesse when triaging of errors, thereby making the triage process less prone to human error and less costly in human time.

As such, as described herein, a "Proactive Engine," which is a continuous software loop, monitors logs from a variety of sources and is prepared to identify interruptions in service during an incident's initial stages. The Proactive Engine not only has the ability to associate alerts to business workflows, but can also automatically perform actions to begin system recovery, based on recorded solutions to similar past incidents.

These features are enabled by at least the following four software processes continually running in parallel and feeding information to each other in a sequence.

First, a custom query in Splunk, Prometheus, or a similar system continually builds up a central data store by querying various logging sources, extracting errors, alerts, or other anomalies, and standardizing them into a single format (e.g., a common output might be readable by a proactive engine since the software processes may work in a heterogeneous environment).

Second, a Context Layer is generated and running diagnostics against the network of dependencies, which further standardizes the data in the central data store that helps identify common failure point between upstream dependencies' failures, causing the impact downstream. Items in the central data store may have various attributes or other metadata absent from the original log, and this metadata may be derivable from other sources.

Third, a profiler may identify that a current state of the system matches a past profile of an incident and will suggest or implement triage actions to handle a possible present incident based on what solved the past incident. These steps can quickly be read and executed by automation execution script.

Fourth, a profiler outcome engine may provide a feedback loop back into the profiler. When a current incident is matched to an incident profile and a triage action selected based on that profile is successful in resolving the incident, that outcome is used to increase the confidence that the profile and triage response represent the best way to handle a future situation that matches the profile. Conversely, if the incident is not resolved by the automated triage action, a confidence score may be decreased, such that the system is less likely to continue to use an ineffective response when an incident matches the given profile, and may try something else in the future.

By using the conceptual components described above, according to methods discussed in greater detail below, outages can be detected earlier yet with fewer false positives, by more sensitive prediction mechanisms; the data enabling detection and response can be standardized into a homogeneous form despite coming from heterogeneous software elements in the system; and automated responses can be more accurately and closely tailored to a given incident based on the improved data gathering.

A new profiler service may solve the issues addressed in background in combination with the Context Layer such that all inbound alerts to the profiler service contain a standard set of service endpoints with which to triage. With the now common input, the profiler service may systematically check each downstream endpoint for the failing workflow and correlate any host and service based signals with these workflow based triage paths.

A new profiler outcome service may provide outcome patterns back to the profiler service with context about additional alert signals that correlated with the workflow failures so that next time a similar pattern occurs, the profiler service may skip to the triage action, reducing the wasted automation time of checking the full workflow.

One aspect of our approach involves a computer-implemented method for averting possible disruptions to at least one software service. The method involves querying data storage to identify a prevalence of errors associated with a particular software component or hardware component; supplementing identified errors with upstream and downstream contextual metadata and generating a profile of a current state of the plurality of software components and hardware components; matching the generated profile with a past profile, the past profile being associated with a desired automated triage action; and performing the automated triage action. In some implementations, the automated triage action can be, for example, at least one of recycling a server, shutting down a server, redirecting traffic away from a server, or switching over a rail in a multi-rail blue-green architecture. The type of automated triage actions that may be implemented is not limited without departing from the teachings herein.

Further feedback steps to improve the performance of the system in future invocations may also be included.

Another aspect of our approach involves a system for averting possible disruptions to at least one software service. The system includes, data storage containing logged alerts from a plurality of software components and hardware components working together to provide the at least one software service, one or more processors, and non-transitory memory storing instructions that, when executed by the one or more processors, cause the one or more processors to: query the data storage to identify a prevalence of errors associated with a particular software component or hardware component; supplement identified errors with upstream and downstream contextual metadata and generate a profile of a current state of the plurality of software components and hardware components; match the generated profile with a past profile, the past profile being associated with a desired automated triage action; and perform the desired automated triage action.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any claim herein or implementation), of which:

DETAILED DESCRIPTION

The systems and methods described herein may apply to a wide variety of contexts when numerous computing devices or modules are in communication with one another to provide services to an end user.

Figure 1A:
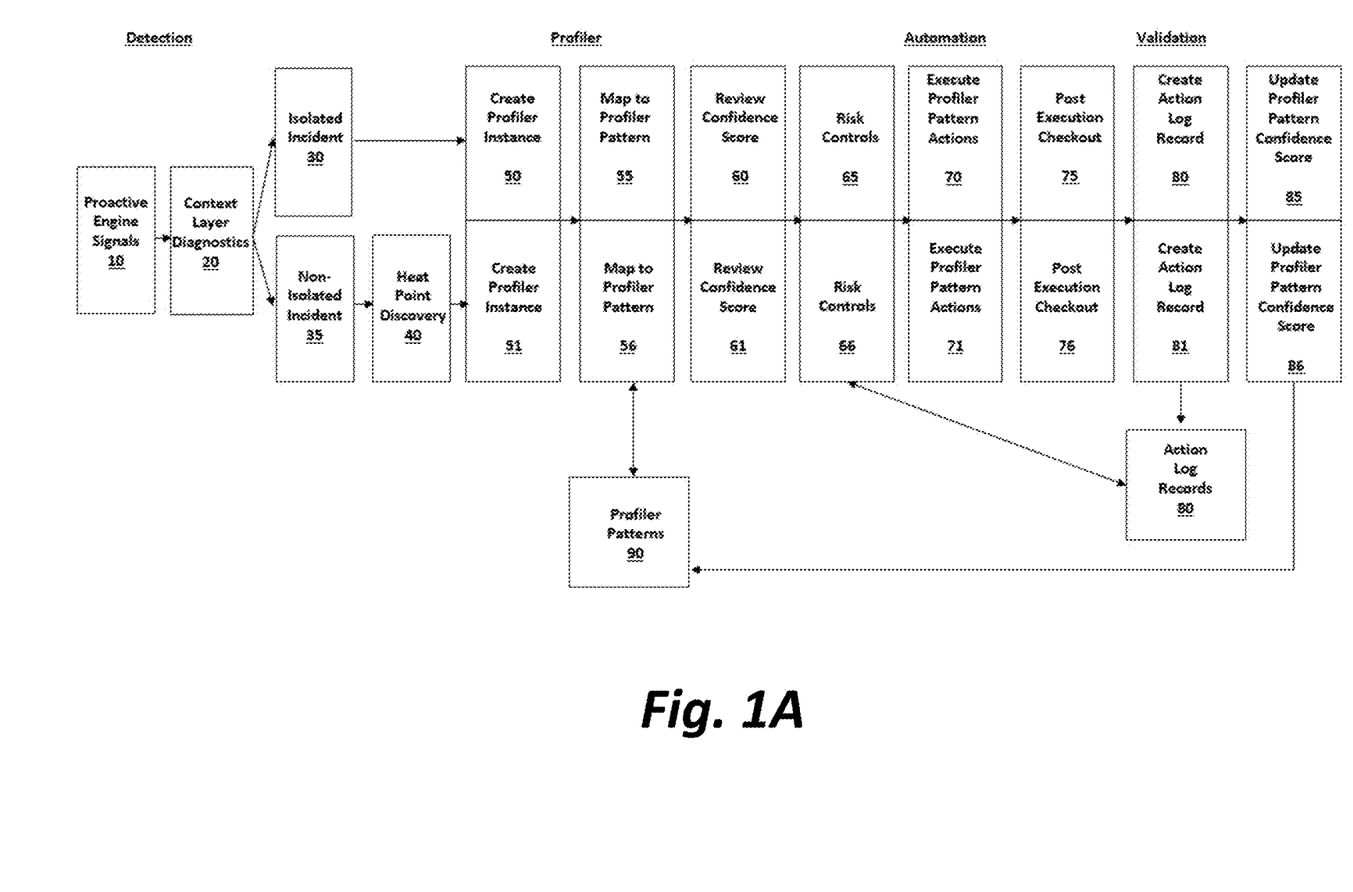
FIG. 1A illustrates, in simplified form, one example of a workflow diagram in a Proactive Engine.

FIG. 1A illustrates, in simplified form, one example of a workflow diagram in a Proactive Engine. The technical workflow shows a logic flow for reading Proactive Engine output, leveraging its Context_Layer diagnostics and comparing scenarios to existing profiles where the Proactive Engine has developed self-healing confidence score logic. The Proactive Engine signals when a failure is occurred in a system 10. A Context Layer run diagnostics against all dependencies of given failure 20. For example, the Proactive Engine retrieves Context Layer Diagnostics report based on service failure returned (e.g., health diagnostics run against all adjacent services (as an example, up to 25 steps away)). A next step may have two paths, two process, depending on isolated incident or non-isolated incident in a system.

For example, the Context Layer may be uniquely converting single URL based alert signals to "Workflow alerts" by passing "full stack"/"Downstream service map" context to a controller.

For example, a new Context Layer may contain the entire downstream stack for all workflow components and their contact information for each front end workflow and add this context to the triggered alert from these types of monitoring tools.

The process may be implemented such that, if the diagnostics show the Proactive Engine output is an isolated issue 30 (e.g., either one to many nodes isolated on single host, or one to many nodes isolated across a single service), the Proactive Engine creates a Profiler_Instance 50.

The Proactive Engine may find the most similar Profiler_Pattern 55 from an inventory. For Example, The Profile can be stored in a key value pairs data object such as JavaScript Object Notation (JSON):

Profile A={"profiler_scenario": "Single_Node_5xx", "Failure_Type": "500", "Isolated to Host": True, "Isolated to App": True, "failure_count_query": "6", "day_of_week": "Friday", 'business_hours': false, 'corrective_action': 'restart'}.

The profile may be selected among profile patterns in the inventory 90. The profile patterns record failure scenarios defined by common failure symptoms, correction actions and a confidence level 90 (e.g., success rate.)

The Proactive Engine may check a recent Action_Log_Record 65. For example, for these host/port, if Action_Log_Record was a recent automation executed in past 45 minutes, the Proactive Engine may stop the RPA (Robotic Process Automation) and escalate to a system by being notified directly to SRE (Site Reliability Engineering). For example, invasive corrective actions, such as LB activity, recycle activity, escalations, and so forth, can be notified directly to SRE (Site Reliability Engineering). If Action_Log_Record was not a recent automation executed in past 45 minutes, the Proactive Engine may continue Automation (e.g., data can be used to apply relevant custom controls, such as "Don't restart same thing twice in X amount of minutes").

The Proactive Engine checks if Profiler_Pattern shows an adequate confidence score 60. For example, if Profiler_Pattern did not show an adequate confidence score, the Proactive Engine may stop the RPA (Robotic Process Automation) and escalate to a system by being notified directly to SRE (Site Reliability Engineering). For example, invasive corrective actions, such as LB activity, recycle activity, Escalations, and so forth, can be notified directly to SRE (Site Reliability Engineering). If Profiler_Pattern shows an adequate confidence score, the Proactive Engine may execute Self-Healing (e.g., Profiler_Pattern may tell the Action Steps to take) on the node(s) 70. The Proactive Engine performs a post Action Validation Check 75 and creates an Action_Log_Record 80. For example, the log may be as follows:

"log={service name: xyz, Infra: xyz, Timeframe_Variables: xyz, business_day_info, action: xyz, success: true}."

The Proactive Engine updates the confidence level for that profile based on a success outcome 85. For example, if an action healed the failure, the system assigns a +2 Confidence Score. If an action did not heal the failure, the system assigns a −1 Confidence Score. The numeric amount that is increased and decreased might be customized according to the particular application.

The other process (the other path) of the logic flow for reading Proactive Engine output may be that if the Diagnostics show larger failure pattern on multiple Context Layer dependencies (non-isolated incident) 35, the Proactive Engine may look for other recent execution patterns (e.g., recent alerts in past 15 minutes), and cross the Context Layer diagnostics pulled, attempting to find common failure points (heat points) 40. If a common heat point is found across many alert signals based on all signals having the same common downstream dependency, this information will be passed on to the profiler. This is required so the profiler doesn't run needless low level triage actions when there is a wider scope to the impact. The heat points are based on a Context Layer Analysis and common failure points seen (root cause). The Proactive Engine creates a Profiler Instance and builds the Profile_Instance based on a heatpoint (s) analysis 51. The Proactive Engine may find the most similar Profiler Pattern 56 from an inventory. For Example, the Profile may be as follows:

Profile A={"profiler_scenario": "Single_Node_5xx", "Failure_Type": "500", "Isolated to Host": True, "Isolated to App": True, "failure_count_query": "6", "day_of_week": "Friday", 'business_hours': false, 'corrective_action': 'restart'}.

The profile may be selected among profile patterns in the inventory 90. The profiler patterns records failure scenario defined by common failure symptoms, and correct action and a confidence level 90 (e.g., success rate.)

The Proactive Engine checks recent Action_Log_Record at 66. For example, for these host/port, if Action_Log_Record was a recent automation executed in past 45 minutes, the Proactive Engine stops RPA (Robotic Process Automation) and escalates to a system by being notified directly to SRE (Site Reliability Engineering). For example, invasive corrective actions, such as LB activity, recycle activity, escalations, and so forth, can be notified directly to SRE (Site Reliability Engineering). If Action_Log_Record was not a recent automation executed in past 45 minutes, the Proactive Engine continues Automation.

The Proactive Engine checks if Profiler_Pattern shows an adequate confidence score 61. For example, if Profiler_Pattern did not show an adequate confidence score, the Proactive Engine stops RPA and escalates to a system by being notified directly to SRE (Site Reliability Engineering). For example, invasive corrective actions, such as LB activity, recycle activity, escalations, and so forth, can be notified directly to SRE (Site Reliability Engineering). If Profiler Pattern shows an adequate confidence score, the Proactive Engine may execute Self-Healing (e.g., Profiler_Pattern may tell Action Steps to take) on node(s) 71. The Proactive Engine performs post Action Validation Check 76. The Proactive Engine creates Action_Log_Record 81. For example, the log may be as follows:

"log={service name: xyz, Infra: xyz, Timeframe_Variables: xyz, business_day_info, action: xyz, success: true}."

The Proactive Engine updates confidence level for that profile based on success outcome at 86. For example, if an action healed failure, the system may assign a +2 Confidence Score. If an action did not heal failure, the system may assign a −1 confidence Score. The numeric amount of increase or/and decrease might be tailored and customized accordingly.

Figure 1B:
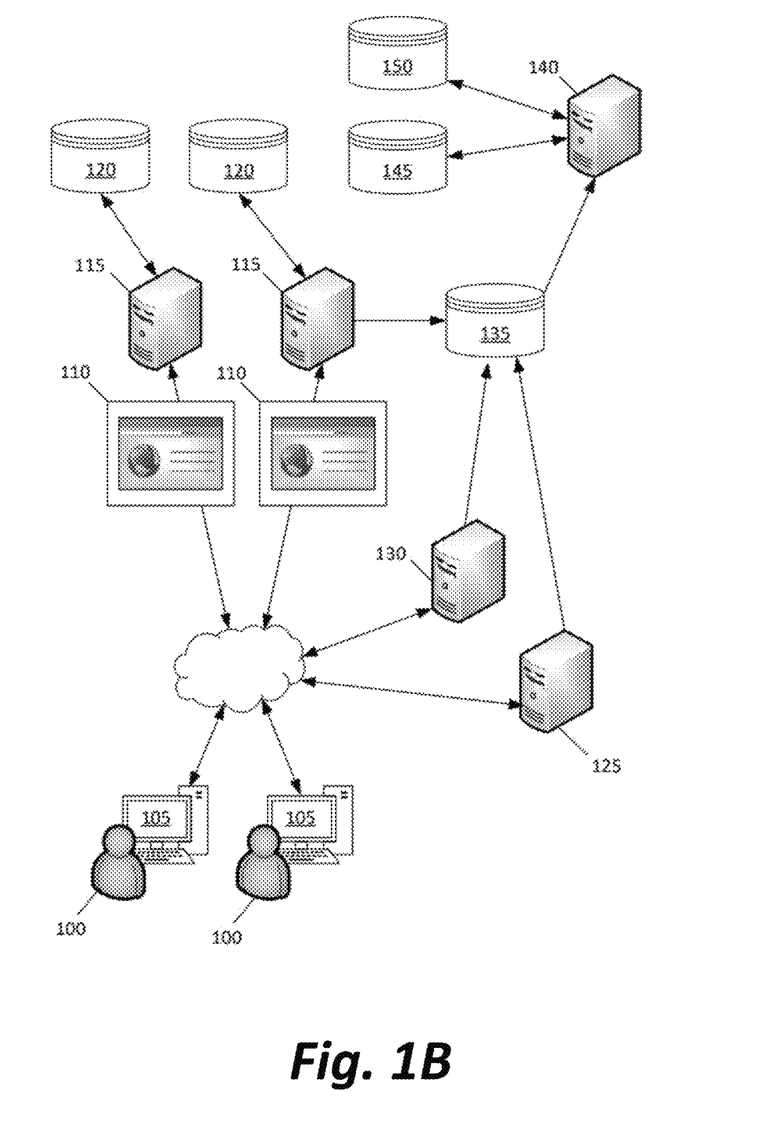
FIG. 1B illustrates, in simplified form, one example of a system of computing devices used to provide multiple web applications to end users over a network, and to detect when an incident may degrade the responsiveness or availability of those web applications according to the teachings herein.

FIG. 1B illustrates, in simplified form, one example of a system of computing devices used to provide multiple web applications to end users over a network, and to detect when an incident may degrade the responsiveness or availability of those web applications.

One or more users 100 use various computing devices 105 (such as, for example, a desktop computer, laptop computer, mobile computing device, or any other computing device) to access various applications 110 provided by servers 115, or various databases or other resources 120. In order to access them, the users 100 communicate with a credentials server 125 to verify their identity (e.g., via a password, multifactor authentication, biometric authentication, or other methods) and be issued a token or similar manner of demonstrating identity to other devices in a network. Then, upon attempting to interact with an application 110 or another resource 120, an entitlements server 130 may be consulted to determine whether the given user is actually entitled to perform the desired action. Assuming that the entitlements do exist, the user's 100 interactions with the web applications 110 will be approved.

The incident detecting and profiling server 140 will also operate a number of software modules associated with the successive functions of retrieval, detection, profiling, triage, and historical assessment for feedback, as previously mentioned and as will be described in connection with FIG. 2 and discussed further below. As part of these tasks, the incident detecting and profiling server 140 will access and modify data related to profiles of past incidents stored in a profiles storage 145, as well as data related to the outcomes of prior triage attempts (whether successful or unsuccessful) associated with a profile that matched the state of the system at the time of the triage attempt.

Note that FIG. 1B depicts only one example topology or arrangement of devices in a simplified manner, and ultimately, many different configurations of systems can be used in conjunction with implementations of the teachings herein beyond that which is depicted in FIG. 1B.

For example, although a particular division of functions between devices is described herein, other configurations are possible in which functions are divided among devices differently. All of the functions of the credentials server 125, the entitlements server 130, the incident detecting and profiling server 140, and/or web application provisioning servers 115 might conceivably be integrated into a single server with multiple threads executing different software modules simultaneously. The log storage 135, profiles storage 145, incident outcome storage 150, and any other storage 120 might represent different tables, partitions, or folders within a single database, data lake, or other storage system.

Extending in the other conceptual direction, although several of these computing elements are described as if they are one computing device in a single location, they might be instead a cluster of computing devices sharing functionality for concurrent processing, or even a cloud-based solution with multiple access points to similar systems that synchronize their data and are all available as backups to one another.

The specific number of computing devices and whether communication between them is network transmission between separate computing devices or accessing a local memory of a single computing device is not as important as the functionality that each part has in the overall scheme.

Figure 2:
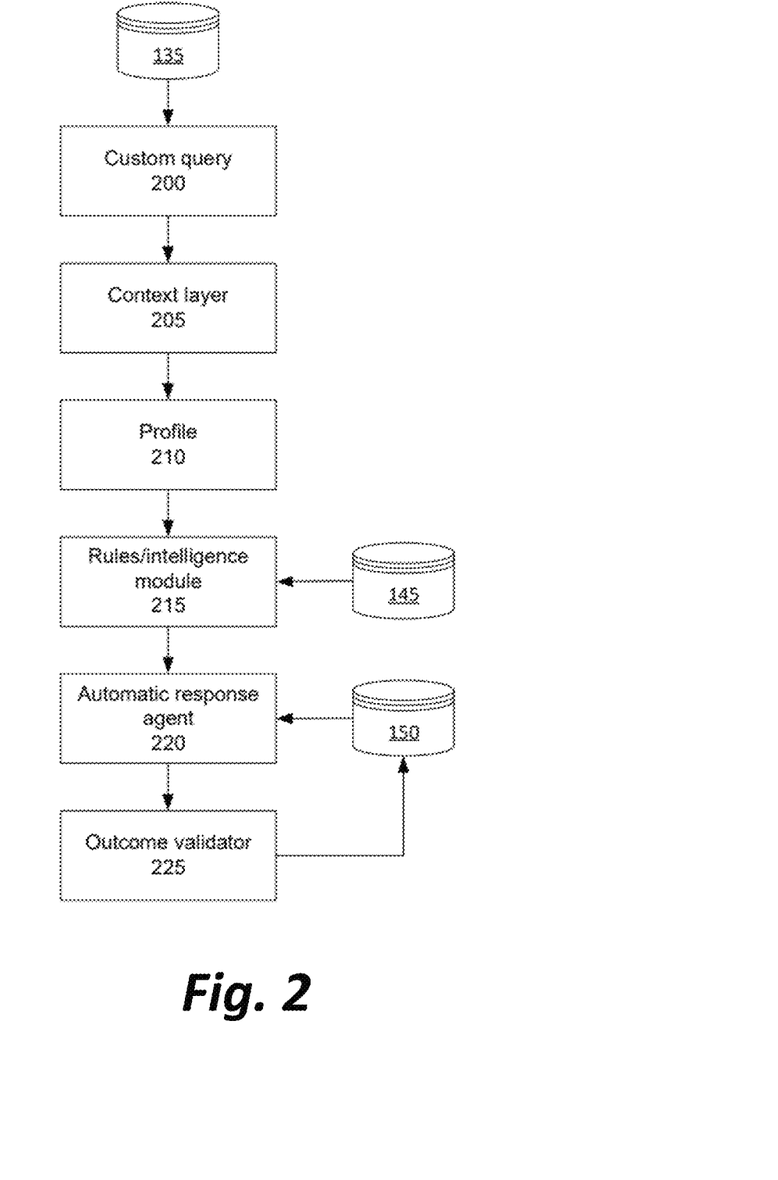
FIG. 2 illustrates, in simplified form, one example of a conceptual structure of modules used to accomplish methods according to the teachings herein.

FIG. 2 illustrates, in simplified form, one example of a conceptual structure of modules used to accomplish methods described herein.

Various logs of alerts in the storage 135 are periodically retrieved by a custom query 200 as described below in relation to FIG. 3. The custom query enriches the log data where possible to produce a Context Layer 205 that shows upstream and downstream elements of a request beyond only the point where the logged error was generated. If any error rates appear to be abnormally high, the system assumes that an incident may be underway (see FIG. 4).

The Context Layer 205 is used to generate a profile 210 of the current state of the system and to supply the profile to a rules/intelligence module 215. The rules/intelligence module 215 compares the current profile to past profiles retrieved from the profile storage 145 to identify a matching profile and associated proposed manner of resolving the incident (see FIG. 5).

Figure 6:
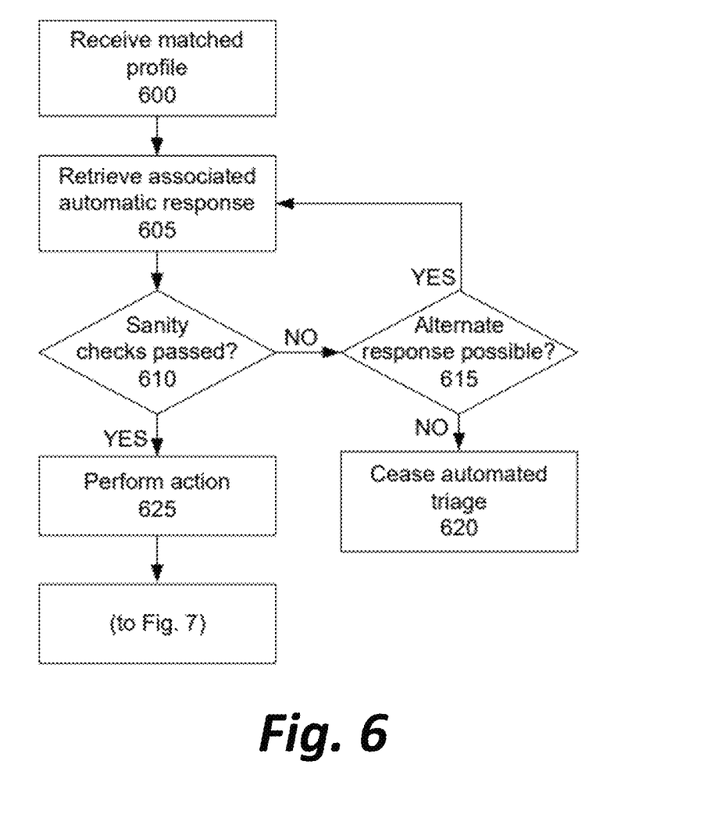
FIG. 6 illustrates, in simplified form, a flowchart for one example of a method of automating a response to an incident according to the teachings herein.

The retrieved proposed manner of resolving the incident is forwarded to an automatic response agent 220 to implement the response (see FIG. 6). Finally, an outcome validator 225 determines whether the action resolved the incident, and populates the incident outcome storage 150 accordingly, to be used in future training of or changes to the rules/intelligence module 215.

Figure 3:
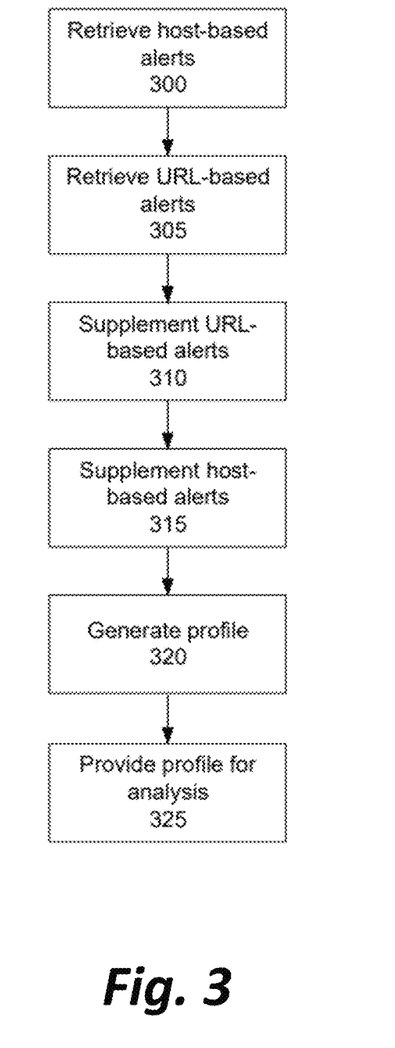
FIG. 3 illustrates, in simplified form, a flowchart for one example of a method of receiving and supplementing data to form a contextual data layer for software triage according to the teachings herein.

FIG. 3 illustrates, in simplified form, a flowchart for one example of a method of receiving and supplementing data to form a contextual data layer for software triage.

Alerts may be generated by and retrieved from a variety of sources in a system, including most particularly host-based alerts (Step 300) and URL-based alerts (Step 305).

The host-based alerts may include, among other examples, alerts triggered when a device's CPU utilization rate is too high, when available volatile memory or long-term disk space is too low, an excessive number of concurrent sessions maintained, an excessive number of incoming requests, any other factor that may apply to the device itself, or any factor that may apply to server software that is independent of the particular URLs provided by or API requests being satisfied by that server software.

The URL-based alerts may include alerts triggered by specific existing monitoring software such as Apica, software that is commercially available from the Apica Project (www.apica.org), or AppDynamics, software that is commercially available from the Observability Platform (www.appdynamics.com). The URL-based alerts may be triggered, for example, when accessing a particular resource or API, as well as basic HTTP logs showing that attempts to access a particular URL led to an HTTP error, unacceptably high latency, or that the response to the URL contained some error message within it.

Because the URL-based alerts—unlike the host-based alerts—concern the end result of a chain of communications traversing multiple devices, the URL-based alerts may lack important context regarding which host was intended to satisfy the request, or what application or other conceptual grouping of API elements the URL is associated with. Conversely, the host-based alerts, which are triggered at a machine level (rather than an application level), will lack the context regarding what applications or URLs might be affected by the underlying issue that triggered the host-based alert. In both types, an alert may lack information concerning the full stack of upstream or downstream components that could affect the provision of services.

In one example implementation, the URL-based alerts are supplemented (Step 310) to include host information or full stack information based on stored metadata concerning which hosts serve which URLs, which APIs and resources are invoked when a particular URL is requested, and so on. In that example implementation, the host-based alerts are not supplemented, based on less valuable data being added by the supplementation. Nonetheless, optionally, these alerts could be supplemented too (Step 315).

In the example case that supplements only the URL-based alerts, the supplementation (i.e., Context Layer) is essentially the infrastructure topology. However, in large firms, this topology is difficult to represent and maintain. In such cases, the Context Layer is preferably supplied by any common log scraping tool, such as Splunk, that identifies and groups logged events by a unique identifier that is shared between them and the URL-based alert. For example, it is generally industry standard to include a unique log identifier that allow support groups utilizing log scraping tools such as Splunk to tie together the stacktrace of a given workflow. This "unique log identifier" can be called anything, and "unique_id" can be preferably called for the "unique log identifier" hereafter. It is common for log scraping tools to include capabilities to search the ingested logs for information. In this case, a Splunk query or other query can be configured to identify, and to assign as variables such as "URL1", "URL2", etc., as many upstream and downstream points in the system as are necessary. In testing, a value of 15 elements in the full stack has been found to be a good balance between retrieving too much information and omitting possibly relevant information. However, depending upon the particular implementation, other element values may be more appropriate.

After the data is fully supplemented, it can be collated as a set of all alerts that were received during a particular window of time, to form a "profile" for the state of the system during that window of time (Step 320). This profile is then fed into a rules/intelligence module (Step 325) for comparison with historical profiles retrieved from the profile storage 145.

Examples of attributes that might be stored in profiles that would be generated by such a system include: how many nodes are affected, how many hosts are affected, how many services are affected, the failure type (e.g., HTTP error or other error type), day of the week, and range of time (such as business_hours vs. non-business_hours). Storage in a JSON object or similar format may be particularly advantageous for such a list of attributes; an example profile might be similar to:

{"profiler_pattern_name": "single_node_5xx", "failure_type": "500", "isolated to host": True, "isolated to app": True, "failure_count_query": "6", "day_of_week": "Friday", "business_hours": False, 'corrective_action': 'restart'}.

Figure 4:
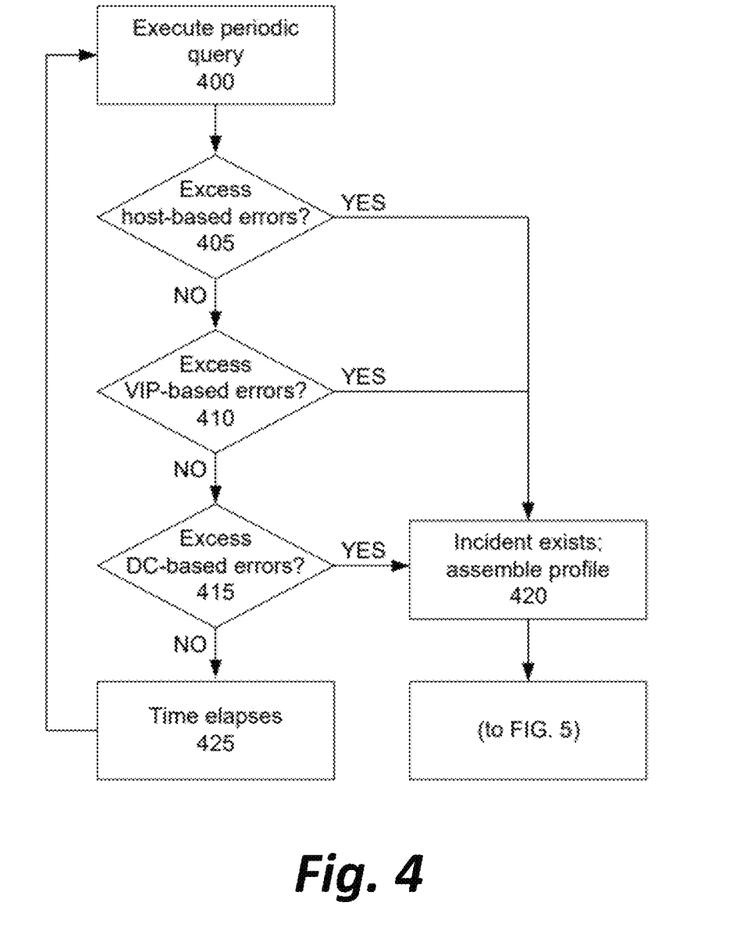
FIG. 4 illustrates, in simplified form, a flowchart for one example of a method of detecting an incident according to the teachings herein.

FIG. 4 illustrates, in simplified form, a flowchart for one example of a method of detecting an incident.

While it is common within the industry to have a variety of different monitoring tools, the log scraping tool Splunk allows for a unique opportunity to execute a custom query periodically with a predefined period between executions (Step 400). In one example implementation, this can be a Splunk query that is executed, for example, every five minutes and that groups logged events by a unique identifier that is shared between them and the URL-based alert. Naturally, different querying systems such as Prometheus, software that is commercially available from the Apica Project (www.apica.org), may be used, and the frequency of the query may be increased or decreased based on how aggressive the system is intended to be in identifying incidents. The custom query will group errors on a variety of axes, such as (but not limited to) by host, by rail in a multi-rail blue-green or similar system, by datacenter, by application, and/or by any other useful conceptual grouping. As disparate subsystems or applications are integrated into the overall system, the custom query can be updated as necessary to ensure coverage and access to those logs, even if they are in a slightly different format from other logs present in the system.

In one example implementation, the query generates a conceptual heatmap of hosts, virtual IP addresses (VIPs) associated with one rail in a multi-rail blue-green or similar system, such as described in commonly owned, U.S. Pat. Nos. 11,595,495 and 11,914,992, incorporated herein by reference in their entirety, and data centers using a query such as:

index=log-xxxxx-prod-c
 sourcetype=iis:access
 env=prod-1 OR env=prod-2
 . . .
 | stats
 count as Host_Traffic
 count(host_error) as Host_HttpError
 by Iaas_hostname Vip Datacenter
 | eventstats sum(Host_Traffic) as Vip_Traffic by Vip
 | eventstats sum(Host_HttpError) as Vip_HttpError by Vip
 | eventstats sum(Host_Traffic) as DC_Traffic by Datacenter
 | eventstats sum(Host_HttpError) as DC_HttpError by Datacenter
 | eventstats count(Iaas_hostname) as Host
 . . .
 | eval Host_Status=if(Host_HttpError/Host_Traffic<.01, "Green", if(Host_HttpError/Host_Traffic>.1, "Red", "Amber"))
 | eval Vip_Status=if(Vip_HttpError/Vip_Traffic<.01, "Green",
 if (Vip_HttpError/Vip_Traffic>.1, "Red", "Amber"))
 | eval DC_Status=if(DC_HttpError/DC_Traffic<.01, "Green",
 if(DC_HttpError/DC_Traffic>0.1, "Red", "Amber"))

The "red", "green", and optional "amber" designations may be incorporated into a user interface for viewing current system status, or may simply be used conceptually for identifying problematic nodes.

Using the output of the custom query, a number of checks may be performed according to a configurable rule system. In one example implementation, these checks may include whether:

a single host is returning HTTP errors to over 10% of the incoming requests to that host (Step 405);
 the virtual IP address (VIP) associated with one rail in a multi-rail blue-green or similar system is returning HTTP errors to over 10% of the incoming requests to that VIP (Step 410); and
 a single data center is returning HTTP errors to some percentage, for example, over 10%, of the incoming requests to that data center (Step 415).

Naturally, additional checks may be added for other aspects of a computing network, or existing checks removed, and the thresholds for an error may be separately defined in each check and may be more or less sensitive than the 10% value listed in examples above.

If any of these checks register as true, an incident is assumed to be underway (Step 420) and the profiling of the incident can occur, as discussed below in connection with FIG. 5. If none of the checks trigger, the system will permit the interval of time to elapse (Step 425) before the query is re-executed (back to Step 400).

Figure 5:
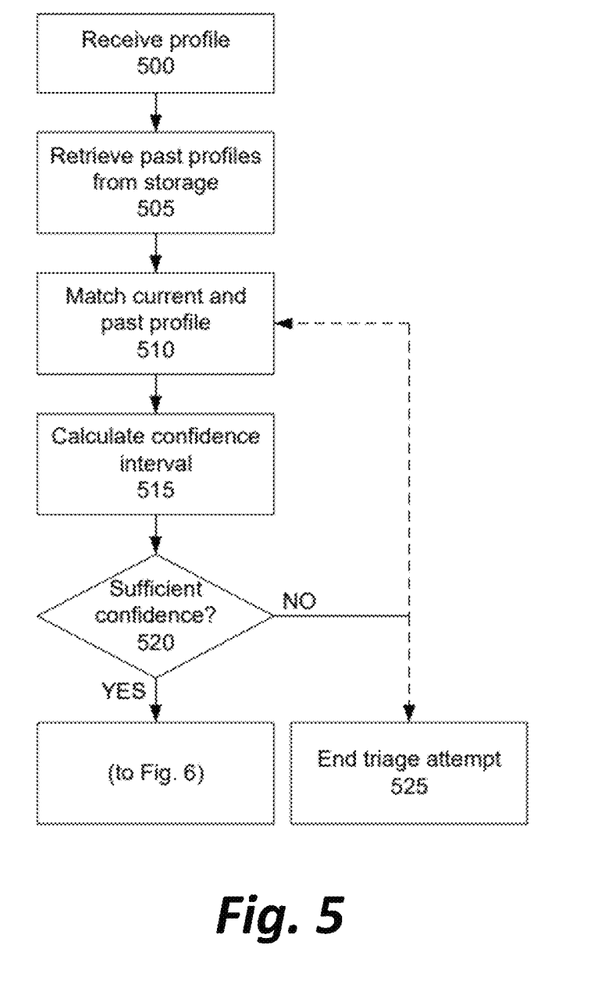
FIG. 5 illustrates, in simplified form, a flowchart for one example of a method of profiling an incident according to the teachings herein.

FIG. 5 illustrates, in simplified form, a flowchart for one example of a method of profiling an incident.

Upon receiving a profile of the current possible incident (Step 500), the rules/intelligence module will retrieve past incident profiles from the profiles storage 145 (Step 505) and attempt to pair the current profile to the closest matching existing profile (Step 510).

Although a perfect match is possible, it is more likely that the closest match will be implemented to use what is known in the art as a "fuzzy" match. The matching process may be performed via any of a number of techniques. One technique may include training a machine learning clusterer on profile data and allowing the machine learning process to organically identify which aspects of profiles are most important in determining a match. Another technique may include scoring profiles with weighted scores on each attribute, such that, for example, a match in HTTP error type earns a predefined number of points, and a match in time of day earns a different, lesser number of points.

After identifying a match, the rules/intelligence module will calculate a confidence value or interval that the past profile matches the current incident profile and that the automated response associated with the past profile will be successful (Step 515). If the confidence level is insufficiently high (Step 520), it is possible that a second best profile will be identified to see if a higher confidence level results, or that automated triage will cease (Step 525) and a human will be notified by email, UI alert, or other manner in order to intervene and identify a profile or select a response and bypass the automated triage. Further, if no profile match is found (Step 520), a profiler outcome engine creates a new profile, and provides its findings back into the "Profiler" (Step 510) closing and automating the loop. Based on success results, a confidence score is dynamically updated in the Profiler and leveraged for future executions.

If the confidence level is sufficiently high, the system will be able to proceed with implementing an automated response.

FIG. 6 illustrates, in simplified form, a flowchart for one example of a method of automating a response to an incident.

Once a best matching profile has been selected (Step 600), the system will retrieve the automated response associated with that profile (Step 605).

In one example implementation, a number of automation controls, control rules or "sanity" checks are performed (Step 610) rather than blindly implementing the automated response. These controls, rules or checks may include, for example, enforcing a minimum time interval between resets of a given server or other node, so that the system does not end up in a loop of resets that only temporarily solves a problem but allowed it to return quickly; checking the utilization of or traffic passing through other servers and ensuring that a reset will not excessively tax them; checking a predefined list of components to which a particular solution should never be applied, such as not clearing out a queue that contains critical information and merely pausing the processing of the queue instead; and so on.

If the controls, rules or checks do prevent the intended action, another action may be automatically selected, if possible (Step 615), and the controls, rules or checks are performed on that other action as well, or if no other selection is possible, the automated response attempts will cease (Step 620). The cessation in automated attempts may also correspond with generating an email, UI alert, or other message to, for example, a human engineer or IT personnel, asking them to take over and attempt to resolve the problem.

If the controls, rules or checks do not prevent the intended action, it will automatically be performed (Step 625). In various implementations, the automated response may include (but are not limited to) any one or more of re-cycling an affected node, deactivating an affected node, redirecting traffic away from an affected node using a configurable load balancer or other routing changes, changing the default rail in a multi-rail blue-green environment, failover to a different element in a CDN/cloud-based solution, clearing event queues or other queues that are overfull, performing additional queries to generate a report as input to another system or to a human, or providing a user interface for a human engineer to control rail switches/nodes directly. Additional responses may be conceived of and incorporated into the system if appropriate.

As a result, in the ideal case, the system will be completely self-healing without any need for human intervention. Moreover, the system can be configured to learn from its prior attempts at self-healing by addition of a feedback loop that validates the outcome of the automated response and determines whether the confidence in that response should be increased or decreased.

Figure 7:
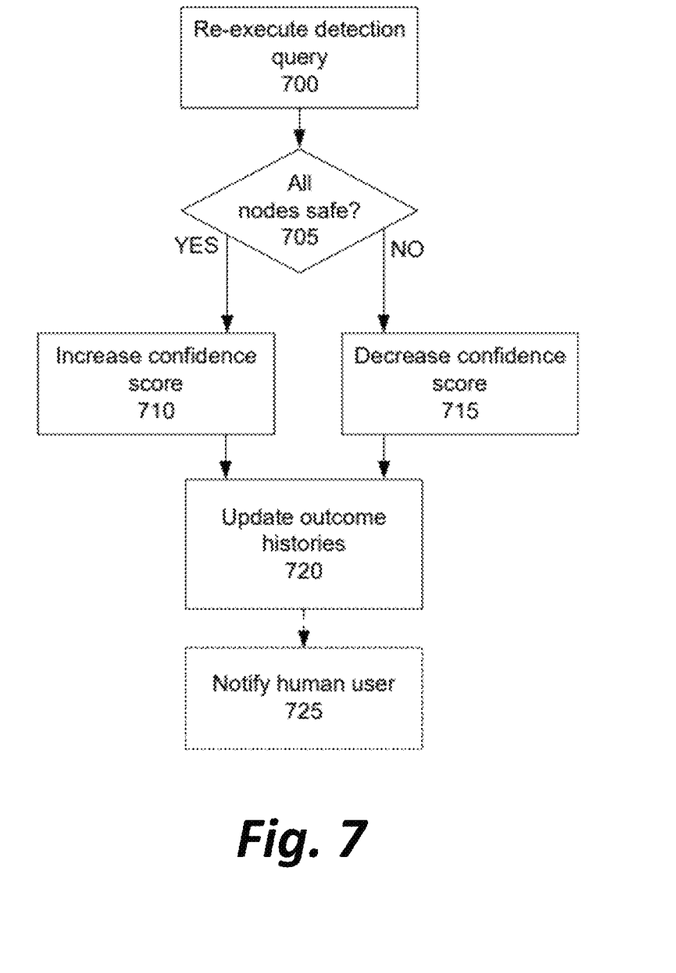
FIG. 7 illustrates, in simplified form, a flowchart for one example of a method of validation after an automated response to an incident according to the teachings herein.

FIG. 7 illustrates, in simplified form, a flowchart for one example of a method of validation after an automated response to an incident.

After an automated response has been performed, the original heatmap detection query is re-executed (Step 700), retrieving system status information necessary to check whether all nodes that were previously designated as "red" are now designated as "green", or to check for whatever similar scoring or classification system is used instead.

If all such nodes do have a "green" designation or other "safe" classification (Step 705), it can reasonably be concluded that the triage was successful, and the confidence score associated with the possible response for the profile is increased (Step 710).

If some nodes still lack a "green" or "safe" designation, it can reasonably be concluded that the triage was unsuccessful and the confidence score associated with the possible response and that profile would be decreased (Step 715). In the example implementation relying on the conceptual heatmap detection query, if that query is capable of producing additional classifications beyond "red" and "green," such as "amber," the system may be configured to handle a transition from "red" to "amber" as either a success or a failure, depending on the needs of a particular system.

In either event, perceived success or failure, the incident outcome storage 150 data is updated to reflect it (Step 720).

In an alternative, optional, approach, the system can provide a report or user interface to human users (Step 725) indicating the automatic triage attempted, whether it appears to have been successful, and offering opportunities to reverse or modify the triage if the human does not agree that an automated response was warranted or acceptable.

The end result of all of these methods, when used in conjunction, is an automated system that can completely replace a human engineer's workflow from beginning to end: automated standardization of data from tools that don't "speak the same language", where the diagnostics collection via Context Layer provides heat-point detection to the profiler/automation, automated profiling of incidents, automated triage actions to resolve incidents, and automatic feedback/reinforcement learning to refine future behavior.

Although FIG. 1B depicts one example configuration of computing devices and software modules to accomplish the software-implemented methods described above, those methods do not inherently rely on the use of any particular specialized computing devices, as opposed to standard desktop computers and/or web servers.

Figure 8:
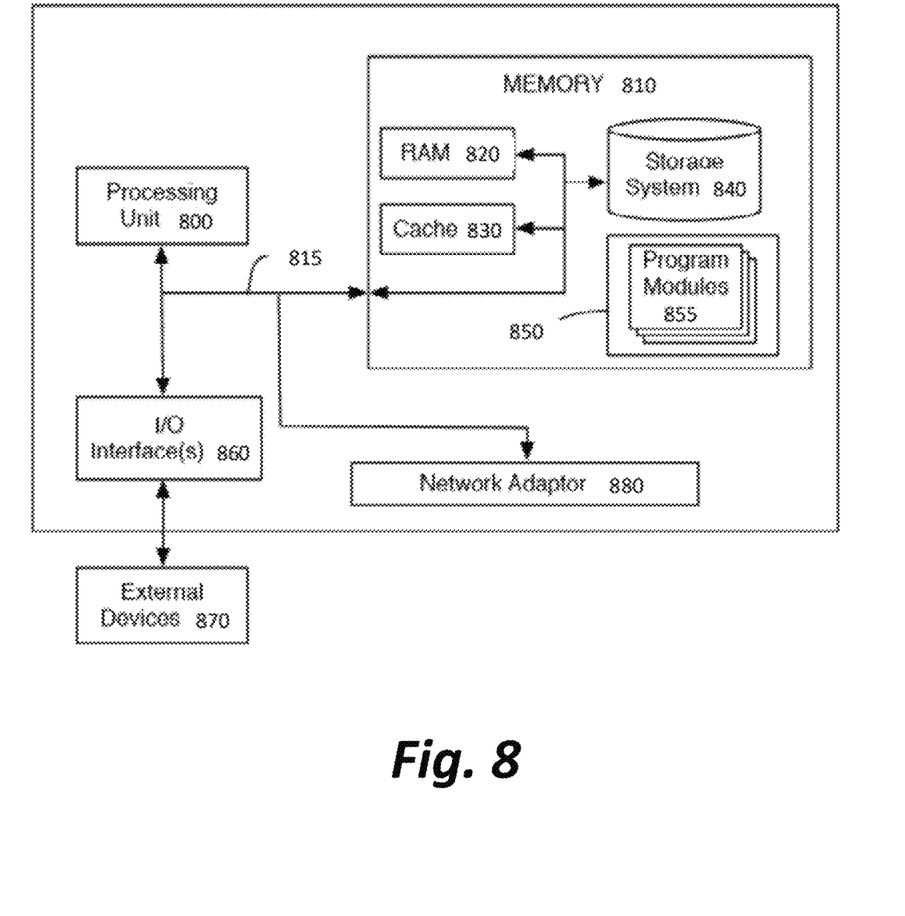
FIG. 8 is a high-level block diagram of a representative computing device that may be utilized to implement various features and processes described herein.

For the purpose of illustrating possible such computing devices, FIG. 8 represents various enabling devices and technologies related to the physical components and architectures described above. FIG. 8 is a high-level block diagram of a representative computing device that may be utilized to implement various features and processes described herein, for example, the functionality of incident detecting and profiling server 140, the various storages 120, 135, 145, 150, the various other servers 115, 135, 130, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computing device is illustrated in the form of a special purpose computer system. The components of the computing device may include (but are not limited to) one or more processors or processing units 800, a system memory 810, and a bus 815 that couples various system components including memory 810 to processor 800.

Bus 815 represents one or more of any of several types of bus structures, including a memory bus or memory controller, a peripheral bus, an accelerated graphics port, and a processor or local bus using any of a variety of bus architectures.

The computing device typically includes a variety of computer system readable media. Such media may be any available media that is accessible by the computing device, and it includes both volatile and non-volatile media, removable and non-removable media.

System memory 810 can include computer system readable media in the form of volatile memory, such as random access memory (RAM) 820 and/or cache memory 830. The computing device may further include other removable/non-removable, volatile/non-volatile computer system storage media. By way of example only, storage system 840 can be provided for reading from and writing to a non-removable, non-volatile magnetic media (not shown and typically referred to as a "hard drive"). In such instances, each can be connected to bus 815 by one or more data media interfaces. As will be further depicted and described below, memory 810 may include at least one program product having a set (e.g., at least one) of program modules that are configured to carry out the functions of embodiments described in this disclosure.

Program/utility 850, having a set (at least one) of program modules 855, may be stored in memory 810 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 870 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 860.

In addition, as described above, the computing device can communicate with one or more networks, such as a local area network (LAN), a general wide area network (WAN) and/or a public network (e.g., the Internet) via network adaptor 880. As depicted, network adaptor 880 communicates with other components of the computing device via bus 815. It should be understood that although not shown, other hardware and/or software components could be used in conjunction with the computing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for averting possible disruptions to at least one software service, comprising:
   data storage containing logged alerts from a plurality of software components and hardware components working together to provide the at least one software service;
   one or more processors; and
   non-transitory memory storing instructions that, when executed by the one or more processors, cause the one or more processors to:
      query the data storage to identify a prevalence of errors associated with a particular software component or hardware component;
      wherein a Context Layer is executed to supplement errors identified from the query with upstream and downstream contextual metadata and generate a profile of a current state of the plurality of software components and hardware components;
      fuzzy match the generated profile with a past profile, the past profile being associated with a desired automated triage action;
      determine, based on the matched past profile, that the prevalence of errors indicate potential disruption to the at least one software service; and
      perform the automated triage action to prevent the potential disruption, wherein the automated triage action is selected from among: recycling a server, shutting down a server, redirecting traffic away from a server, and switching over a rail in a multi-rail blue-green architecture.

2. The system of claim 1, wherein the instructions, when executed by the one or more processors, cause the one or more processors to:
   add context to a URL-based error during the supplementation by matching logs on a unique identifier in the URL-based error.

3. The system of claim 1, wherein each profile collates a number of alerts, by affected components, over a window of time.

4. The system of claim 1, wherein the instructions, when executed by the one or more processors, cause the one or more processors to:
   determine whether the automated triage action was successful in averting a disruption; and
   if the automated triage action was successful, increase a confidence score associated with the action and its associated past profile, and if the automated triage action was unsuccessful, decrease a confidence score associated with the action and its associated past profile.

5. The system of claim 4, wherein the instructions, when executed by the one or more processors, cause the one or more processors to:
   notify a human user of a successful or unsuccessful outcome of the automated triage action.

6. The system of claim 1, wherein the matching of the generated profile with a past profile is performed by a machine learning clusterer.

7. The system of claim 1, wherein the matching of the generated profile with a past profile is performed by a rules-based scoring logic.

8. The system of claim 1, wherein the instructions, when executed by the one or more processors, cause the one or more processors to:
   identify a second prevalence of errors associated with a particular software component or hardware component;
   match a second generated profile with a second past profile, the second past profile being associated with a second automated triage action;
   determine that the second automated triage action cannot be performed without violating a preconfigured rule; and
   alert a human user of a need to intervene.

9. A computer-implemented method for averting possible disruptions to at least one software service, comprising:
   querying non-transitory data storage to identify a prevalence of errors associated with a particular software component or hardware component of a plurality of software components or hardware components;
   wherein a Context Layer is executed to supplements errors identified from the query with upstream and downstream contextual metadata and generating a profile of a current state of the plurality of software components or hardware components;
   fuzzy matching the generated profile with a past profile, the past profile being associated with a desired automated triage action;
   determining, based on the matched past profile, that the prevalence of errors indicate potential disruption to the at least one software service; and
   performing the automated triage action to prevent the potential disruption, wherein the automated triage action is selected from among: recycling a server, shutting down a server, redirecting traffic away from a server, and switching over a rail in a multi-rail blue-green architecture.

10. The method of claim 9, further comprising:
    adding context to a URL-based error during the supplementation by matching logs on a unique identifier in the URL-based error.

11. The method of claim 9, wherein each profile collates a number of alerts, by affected components, over a window of time.

12. The method of claim 9, further comprising:
    determining whether the automated triage action was successful in averting a disruption; and
    if the automated triage action was successful, increasing a confidence score associated with the action and its associated past profile, and if the automated triage action was unsuccessful, decreasing a confidence score associated with the action and its associated past profile.

13. The method of claim 12, further comprising:
notifying a human user of a successful or unsuccessful outcome of the automated triage action.

14. The method of claim 9, wherein the matching of the generated profile with a past profile is performed by a machine learning clusterer.

15. The method of claim 9, wherein the matching of the generated profile with a past profile is performed by a rules-based scoring logic.

16. The method of claim 9, further comprising:
identifying a second prevalence of errors associated with a particular software component or hardware component;
matching a second generated profile with a second past profile, the second past profile being associated with a second automated triage action;
determining that the second automated triage action cannot be performed without violating a preconfigured rule; and
alerting a human user of a need to intervene.

* * * * *